United States Patent [19]
Kamen et al.

[11] Patent Number: 6,093,455
[45] Date of Patent: Jul. 25, 2000

[54] METHOD AND COMPOSITIONS FOR DECORATING GLASS

[75] Inventors: Melvin Edwin Kamen, Highlands; Ming Hu, Piscataway, both of N.J.

[73] Assignee: Deco Patents, Inc., Edison, N.J.

[21] Appl. No.: 08/868,409

[22] Filed: Jun. 3, 1997

Related U.S. Application Data

[63] Continuation-in-part of application No. 08/862,304, May 23, 1997, abandoned.

[51] Int. Cl.$^7$ ................................ B05D 3/06; B05D 3/10
[52] U.S. Cl. ........................ 427/511; 427/287; 427/341; 427/352; 427/515; 427/282
[58] Field of Search .................................... 427/282, 287, 427/511, 514, 515, 493, 340–41, 352, 553, 559; 106/31.05, 31.32, 31.64

[56] References Cited

U.S. PATENT DOCUMENTS

| | | | |
|---|---|---|---|
| 3,872,044 | 3/1975 | Hervey | 260/30.8 |
| 4,065,589 | 12/1977 | Lenard | 428/35 |
| 4,086,373 | 4/1978 | Tobias | 427/44 |
| 4,125,678 | 11/1978 | Stvan | 428/514 |
| 4,135,014 | 1/1979 | Salensky | 428/35 |
| 4,170,663 | 10/1979 | Hahn | 427/44 |
| 4,179,537 | 12/1979 | Rykowski | 427/387 |
| 4,264,658 | 4/1981 | Tobias | 428/35 |
| 4,306,012 | 12/1981 | Scheve | 430/296 |
| 4,390,565 | 6/1983 | Fonda | 427/44 |
| 4,454,179 | 6/1984 | Bennett | 428/41 |
| 4,490,410 | 12/1984 | Takiyama | 427/44 |
| 4,567,107 | 1/1986 | Rizk | 428/425.5 |
| 4,666,756 | 5/1987 | Sakata | 428/202 |
| 4,722,947 | 2/1988 | Thanawalla | 522/120 |
| 4,771,085 | 9/1988 | Lazaridis | 522/77 |
| 4,818,075 | 4/1989 | Takao | 350/339 |
| 4,855,334 | 8/1989 | Maruyama | 522/96 |
| 5,034,244 | 7/1991 | Berrer | 427/54.1 |
| 5,043,363 | 8/1991 | Noguchi | 522/95 |
| 5,085,903 | 2/1992 | Kapp | 428/34.6 |
| 5,112,658 | 5/1992 | Skutnik | 428/34.6 |
| 5,155,005 | 10/1992 | Sato | 430/257 |
| 5,180,757 | 1/1993 | Lucey | 522/76 |
| 5,182,148 | 1/1993 | Kapp | 428/34.6 |
| 5,187,201 | 2/1993 | Haubennestel | 524/31 |
| 5,212,212 | 5/1993 | Fonda | 522/79 |
| 5,294,516 | 3/1994 | Sato | 430/262 |
| 5,300,558 | 4/1994 | Kurisu | 524/707 |
| 5,487,927 | 1/1996 | Kamen | 128/34.4 |
| 5,501,929 | 3/1996 | Kato | 430/49 |
| 5,525,400 | 6/1996 | Manser | 428/196 |
| 5,527,497 | 6/1996 | Kanome | 264/1.33 |
| 5,530,036 | 6/1996 | Sano | 522/79 |
| 5,533,447 | 7/1996 | Johnson | 101/211 |
| 5,535,673 | 7/1996 | Bocko | 101/211 |
| 5,538,821 | 7/1996 | Kakinuma | 430/18 |
| 5,539,064 | 7/1996 | Hashimoto | 525/529 |
| 5,544,582 | 8/1996 | Bocko | 101/211 |
| 5,556,709 | 9/1996 | Kato | 428/426 |
| 5,560,796 | 10/1996 | Yoshimura | 156/240 |
| 5,562,951 | 10/1996 | Kamen | 427/493 |
| 5,571,359 | 11/1996 | Kamen et al. | |
| 5,585,153 | 12/1996 | Kamen | 428/35.7 |
| 5,585,221 | 12/1996 | Noguchi | 430/280.1 |
| 5,587,405 | 12/1996 | Tanaka et al. | |
| 5,656,336 | 8/1997 | Kamen | 427/511 |

FOREIGN PATENT DOCUMENTS

| | | |
|---|---|---|
| 071345 | 2/1983 | European Pat. Off. . |
| 106628 | 4/1984 | European Pat. Off. . |
| 345993 | 12/1989 | European Pat. Off. . |
| 351328 | 1/1990 | European Pat. Off. . |
| 411152 | 2/1991 | European Pat. Off. . |
| 533094 | 9/1992 | European Pat. Off. . |
| 588533 | 3/1994 | European Pat. Off. . |
| 588534 | 3/1994 | European Pat. Off. . |
| 616906 | 9/1994 | European Pat. Off. . |
| 679734 | 11/1995 | European Pat. Off. . |
| 2610213 | 3/1976 | Germany . |
| 3743257 | 12/1987 | Germany . |
| 8505061 | 11/1985 | WIPO . |
| 9534024 | 12/1995 | WIPO . |

OTHER PUBLICATIONS

Photoinitiators For UV Curing, A Formulator's Guide, Ciba–Geigy 1995.
Photomer, Radiation Curing Chemicals, Product Description Lishng, Henkel Mar. 1994.
Technical Data Sheet SST–4 Shamrock Technologies, Dec. 1994.
051 Product Information Silquest Silanes, 1996.
Hüls, Silanes, Silicones, Commercial Products, Huls America, undated.
Product Bulletin, Sarbox Specialty Oligomers Sartomer 1994.
Sartomer, Product Catalog 1993.
Product Profile, Radcure, Feb. 1994.

*Primary Examiner*—Fred J. Parker
*Attorney, Agent, or Firm*—Pryor Cashman Sherman & Flynn; Maxim H. Waldbaum; Meir Y. Blonder

[57] ABSTRACT

A method for decorating a vitreous article, in particular, a glass substrate, comprising applying to the glass in a predetermined design a radiation curable ink composition which is (i) operable when cured to bond to glass, and (ii) strippable from the glass upon exposure to alkali, and curing the ink on the glass by exposing it to the radiation by which it is curable, thereby bonding the ink to the glass; and related compositions; as well as a method for stripping the decorative indicia from glass upon exposure to alkali, and the related compositions.

26 Claims, No Drawings

METHOD AND COMPOSITIONS FOR DECORATING GLASS

This application is a continuation-in-part of U.S. patent application Ser. No. 08/862,304, filed May 23, 1997, entitled "Method and Compositions For Decorating Glass", by inventors Melvin Edwin Kamen, and Ming Hu, now abandoned.

TECHNICAL FIELD

The invention is in the field of decorating vitreous articles with radiation curable inks. In particular, the invention relates to decoration of vitreous articles such as glass, with radiation curable inks which, to facilitate recycling, are capable of being chemically removed from the glass upon exposure to alkali for a specified period of time.

BACKGROUND OF THE INVENTION

Commercial ceramic and glassware is often decorated by applying a pattern in colored ink on the surface of the substrate with screen printing, offset printing, or any other direct application technique. The glass is then baked at high temperatures to bond the design or indicia to the glass surface. This process, sometimes referred to as applied ceramic labeling (ACL), exhibits certain drawbacks. Often, the ink compositions contain heavy metals and volatile organic solvents (VOC's). Both VOC's and heavy metals are undesirable from the environmental point of view. Second, ACL requires high temperature ovens for the baking step, which results in considerable energy usage and an increased potential for worker injury due to the high temperatures at which the process operates. Moreover, the high temperature ovens are expensive, cumbersome pieces of equipment which require considerable floor space in factories.

The decoration of glass with ultraviolet (UV) radiation curable organic pigmented inks for the decoration of glass and ceramic ware is known in the art. Organic inks generally can be cured by exposure to radiation, such as ultraviolet radiation, thus obviating the need for high temperature baking. In addition, UV curable organic inks can be formulated to contain little or no VOC's or other nonaqueous solvents. Organic inks generally exhibit excellent adherence to glass.

In many countries, it is mandatory that beverages such as beer and soda, be marketed in returnable glass bottles. After the beverage has been consumed, the glass bottles are returned to the beverage filler. They are then cleaned, sterilized, refilled, relabeled, then sold again. Decals and paper labels are most often used to decorate returnable beverage bottles. Both types of labels have many drawbacks. For example, both paper labels and decals are expensive. In addition, they are messy, and can easily come off upon exposure to water or other materials. In addition, many of the adhesives used in decals become sticky when subjected to the bottle cleaning process, and cause machines, drains, etc. to be gummed up.

There is a need for a method to decorate returnable beverage bottles that provides excellent decorative effect. In addition, the method must be cost competitive when compared to paper labels and decals. At the same time the decorative indicia applied should be easily strippable from the glass container between fillings.

SUMMARY OF THE INVENTION

The invention is directed to a method for decorating a vitreous article comprising the steps of:
 a) applying to the vitreous article in a predetermined design a radiation curable ink composition which is (i) operable when cured to bond to the vitreous article, and (ii) strippable from the vitreous article upon exposure to alkali,
 b) curing the ink on the vitreous article by exposing it to the radiation by which it is curable, thereby bonding the ink to the vitreous article.

The invention is also directed to a method for stripping decorative indicia from a vitreous article decorated with a radiation cured ink composition containing free acid groups which is (i) operable, when cured, to bond to the vitreous article, and (ii) strippable from the vitreous article upon exposure to alkali, comprising contacting the vitreous article with an aqueous alkaline solution containing 2–20% by weight alkali for a period of approximately 1 to 120 minutes.

The invention is directed to a ink composition comprising, by weight of the total composition:
 5–95% of an acid functional monomer or oligomer,
 5–95% of a monomer or oligomer that does not contain free acid groups,
 5–95% pigment.

DETAILED DESCRIPTION

All percentages mentioned herein are percentages by weight unless otherwise indicated.

The radiation curable ink compositions used in the method of the invention must be operable, when cured, to bond to the vitreous article, which is preferably glass. In particular, the ink compositions must be capable of adhering to glass to a degree sufficient to permit use as a commercial container used for beverages or other consumable materials. At the same time, the polymerized ink compositions must be capable of being readily stripped or removed from the glass upon exposure of the decorated glass to alkali. Glass containers are filled; then they are decorated with the radiation curable ink compositions. After the beverage in the container is consumed, the container is returned to the filler. The decorative indicia is stripped from the glass upon exposure to alkali. The containers are then cleaned, sterilized, re-filled, re-decorated, and shipped again.

Generally, strippable ink compositions are made from radiation curable monomers and/or oligomers having at least one free acid group. The term "free acid" means an acidic group which is capable of reacting with alkali. Examples of such acidic groups are carboxylic acid groups, phosphoric acid groups, sulfonic acid groups and the like. Preferably, the acid group is a carboxylic acid group. The resulting polymerized coating contains free acidic groups which, upon exposure to alkali, react with the alkali to form a salt. As a result, the decorative indicia are much more readily removable from the glass. It should be noted that in order for radiation cured glass coatings to be considered "high performance", decorative indicia must be capable of withstanding exposure to a concentrated aqueous alkali solution for a period of two to four hours. In contrast, the radiation cured ink compositions of the invention must be completely removed from the glass container upon exposure to aqueous alkali before two hours has lapsed; after a period of about 1 to 120 minutes, preferably about 1 to 60 minutes, more preferably about 5 to 30 minutes.

THE INK COMPOSITIONS

The Acid-Functional Monomer and/or Oligomer

The ink compositions used in the method of the invention, contain about 5–95%, preferably about 10–85%, more preferably about 15–75% of a monomer, oligomer, or low molecular weight homo- or copolymer having at least one free acid group. A variety of such materials are suitable, provided they have at least one free acid group, such as a carboxylic acid, sulfonic acid, or phosphoric acid group. The phrase "having at least one free acid group" means that the monomer unit has at least one free acid group, or the oligomer contains at least one monomer unit containing a free acid group, or if a homo- or copolymer, at least one monomer unit thereof contains at least one free acid group. Preferably the ink composition contains a monomer or oligomer, in particular an ethylenically unsaturated monomer or oligomer having at least one free acid group.

In addition, carboxylic acid functional oligomers, such as aromatic acid methacrylate half esters and aromatic acid acrylate half esters, are also suitable acid functional oligomers for use in the method of the invention. Examples of such oligomers are partial esters of anhydride-containing copolymers such as those disclosed in U.S. Pat. No. 4,722,947, which is hereby incorporated by reference. These copolymers correspond to the following formula:

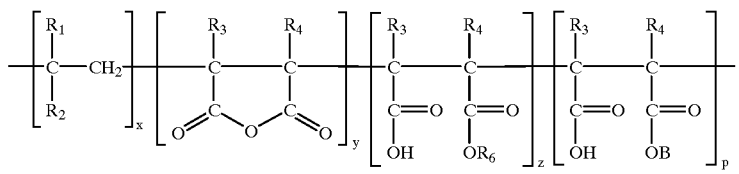

Examples of preferred monomers or oligomers include those having carboxylic acid functional groups such as:

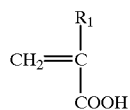

wherein $R_1$ is H, a $C_{1-30}$ straight or branched chain, substituted or unsubstituted, saturated or unsaturated alkyl, aryl, aralkyl, a pyrrolidone, or a substituted or unsubstituted aromatic, alicyclic, or bicyclic ring where the substitutents are $C_{1-30}$ straight or branched chain alkyl, or halogen.

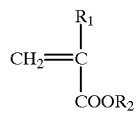

wherein $R_1$ is as defined above, and $R_2$ is X—COOH wherein X is a $C_{1-30}$ straight or branched chain alkyl, aryl, arylalkyl, or $-(CH_2CH_2-O)_n-Y-COOH$ or $-(CH_2CH_2CH_2-O)_n-Y-COOH$ wherein Y is a $C_{1-10}$ straight or branched chain alkyl and n is 1–10,000.

Preferably the monomer or oligomer is of Formula II wherein $R_1$ is H or $CH_3$, and $R_2$ is X—COOH wherein X is a $C_{1-10}$ straight or branched chain alkyl, more preferably ethyl. More preferably $R_2$ is beta-carboxyethyl, e.g. as in beta-carboxyethyl acrylate, which is sold under the tradename B-CEA by UCB Radcure, Inc. B-CEA is a reactive monomer which contains both acrylate and carboxylic acid functionality, predominantly as the acrylic acid dimer, and, in particular, is a mixture of about 40% by weight B-carboxyethylacrylate, about 40% by weight higher homologs of acrylic acid, and about 20% by weight of acrylic acid. The B-carboxyethylacrylate component of this mixture has the following formula:

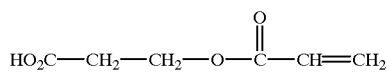

wherein $R_1$ and $R_2$ are each independently hydrogen, $C_{1-20}$ alkyl, aryl, alkaryl, cycloalkyl, or halogen; $R_3$, $R_4$, and Rs (see below) are each independently hydrogen, $C_{1-20}$ alkyl, or aryl; and $R_6$ is the same or different and is alkyl, aralkyl, or an alkyl substituted aralkyl radical containing about 1 to 20 carbon atoms as well as oxyalkylated derivatives thereof; and the subscripts x, y, z, and p are each whole numbers such that the sum of x, y, z, and p may range from about 3 to 20; and x, p, and y are each equal to or greater than 1, and z may be 0; and B is—$OAOCOCR_5CH_2$ wherein A is a linear or branched divalent alkylene of from about 1 to 20 carbon atoms, or an oxyalkylated derivative thereof as described for $R_6$.

Particularly preferred aromatic partial esters of anhydride containing copolymers are those sold by Sartomer, Inc. under the SARBOX® tradename, such as SB-400, SB-500, and SB-600. Particularly preferred is aromatic acid methacrylate half ester in ethoxylated trimethylolpropane triacrylate, which is sold by Sartomer, Inc. under the tradename Sarbox SB500E50.

Other suitable carboxylic acid functional monomers include acrylic acid, bisacrylamidoacetic acid, 4,4-bis(4-hydroxphenyl)pentanoic acid, 3-butene-1,2,3-tricarboxylic acid, 2-carboxyethyl acrylate, itaconic acid, methacrylic acid, 4-vinylbenzoic acid, and mixtures of these materials.

Examples of monomers containing sulfonic acid groups include 2-acrylamido-2-methyl-1-propanesulfonic acid; 2-methyl-2-propene-1-sulfonic acid, 2-propene-1-sulfonic acid, 4-styrenesulfonic acid, 2-sulfoethyl methacrylate, 3-sulfopropyldimethyl-3-methacrylamidopropyl ammonium inner salt, 3-sulfopropyl methacrylate, vinylsulfonic acid, and so on.

Examples of monomers containing phosphoric acid functional groups include bis(2-methacryloxyethyl)phosphate, monoacryloxyethyl phosphate, and so on.

Additional Polymerizable Reactants

In addition, the ink compositions may contain about 5–95%, preferably about 10–85%, more preferably about 15–75% of other polymerizable reactants such as radiation curable monomers, oligomers, or low molecular weight homo- or copolymers, terpolymers, or graft or block copolymers which do not contain free acid groups. Examples of suitable monomers include epoxides, cycloaliphatic epoxides, vinyl chloride, styrene, ethyl acrylate, vinyl acetate, difunctional acrylic monomers such as hydroxy alkyl acrylates, or hydroxy alkyl methacrylates, vinyl butyrate, vinyl methyl ether, methyl methacrylate, isobornyl acrylate, acrylonitrile, or mixtures thereof. Suitable polymers include oligomers, homo- or copolymers, terpolymers, graft copolymers of the above monomers provided they have a molecular weight of less than about 50,000, otherwise it is too difficult to effect polymerization, i.e. curing. Preferred are acrylate homopolymers or acrylate or methacrylate copolymers, preferably acrylate or methacrylate copolymers. Examples of such acrylate or methacrylate copolymers include epoxy acrylates, copolymers of propylene glycol and a dicarboxylic acid, urethane acrylates, and the like. Preferably, the compositions contain one or more polymerizable reactants selected from the group consisting of urethane acrylate copolymers, tripropylene glycol acrylate, epoxy acrylate, and mixtures thereof.

Preferably, the radiation curable compositions of the invention contain about 5–95% by weight of acrylate or methacrylate monomers, or homo- or copolymers which do not contain acid functional groups.

Pigment

The compositions used in the invention preferably contain 5–95%, preferably 5–50%, more preferably 8–35% by weight of the total composition of pigment. A wide variety of pigments are suitable including organic and inorganic pigments. Examples of such pigments are set forth in U.S. Pat. No. 5,178,952, which is hereby incorporated by reference. Inorganic pigments include extender pigments such are baryites, barium sulfate, calcium carbonate, talc, clay, alumina, titanium dioxide, white carbon, chinese white, zinc sulfide, lithopone, ultramarine, Prussian blue, cobalt, chrome oxide, viridian chrome green yellows, oranges, and reds, cadmium, chromium, iron oxides, carbon black, metallic pigments, aluminum powder, bronze powder, zinc chromate, strontium chromate, zinc dust, copper, and so on. Examples of suitable organic pigments include azo pigments, indolinones, isoindolinones, vat pigments, the Lakes, pthalocyanine pigments and so on. The preferred pigment to impart white color to the ink composition is titanium dioxide. Preferred red and yellow pigments are isoindolinones and pyrrolopyrrols as disclosed in U.S. Pat. Nos. 4,415,685; 4,579,949; 4,791,204; 4,666,455; 5,074,918; 4,783,540; 4,914,211; 4,585,878; as well as U.S. Pat. No. 5,571,359 of Kamen, et. al., all of which are hereby incorporated by reference. These pyrrolopyrrols are generally of the formula:

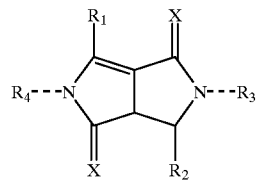

wherein $R_1$ and $R_2$ are each independently alkyl, arylalkyl, aryl, substituted or unsubstituted isocyclic or heterocyclic aromatic radicals; $R_3$ and $R_4$ are each independently H, substituted or unsubstituted alkyl, alkoxycarbonyl, aroyl (e.g. benzoyl), arylalkyl (e.g. benzyl), aryl (e.g. phenyl), alkanoyl, $C_{5-6}$ cycloalkyl, alkenyl, alkynyl, carbamoyl, alkylcarbamoyl, arylcarbamoyl, or alkoxycarbonyl; and X is O or S. Preferred is a compound wherein $R_1$ and $R_2$ are each independently phenyl or naphthyl, $R_3$ and $R_4$ are hydrogen, and X is O. Particularly preferred as a red pigment is pyrrolo 3,4-C pyrrol-1,4-dione, 2,5-dihydro-3,6-di-4-chlorophenyl which has a CAS number 84632-65-5 and is known by the common name C.I. pigment red 254. This pigment is commercially available from Ciba-Geigy Pigments Division, Newport, Del., under the tradename Irgazin DPP Red 80. Other Ciba-Geigy red pigments sold under the tradename Irgazin are also suitable.

Suitable isoindolinones are as set forth in U.S. Pat. Nos. 3,884,955, 3,867,404, 4,978,768, 4,400,507, 3,897,439 and 4,262,120 and 5,194,088 all of which are hereby incorporated by reference. Preferred isoindolinones are tetrachlorocyanobenzoic acid alkyl esters, particularly benzoic acid, 2,3,4,5-tetrachloro-6-cyano-methyl ester which is reacted with 2-methyl-1,3-benzenediamine and sodium methoxide. This pigment composition has the common name C.I. Pigment Yellow 109 and is available commercially from Ciba-Geigy Pigments Division, NewportDel. under the tradename Irgazin yellow 2GLTE. Other pigments in the Irgazin Yellow series as manufactured by Ciba-Geigy are also suitable.

Particularly suitable are blue pigments marketed by Ciba-Geigy under the tradename Irgazin Blue X-3367, or by Whittaker, Clark, & Daniels under the tradename Ultramarine Blue 5009.

Defoaming Agent

The ink compositions used in the invention also preferably contain about 0.01–10% of a defoaming agent, preferably a polyether-containing defoaming agent, which will cause the ink to apply smoothly on the glass substrate without bubbles or unevenness. A wide variety of defoamers are suitable, but preferred are defoamers sold by BYK Chemie under the BYK tradename. Examples of such defoaming agents are alkylvinyl ether polymers set forth in U.S. Pat. No. 5,187,201, which is hereby incorporated by reference. Examples of other defoamers include polyethers such as BYK-052, BYK-053, and BYK-033. BYK-052 and -053 are polyethers such as polyethylene or polypropylene glycol ethers, and in particular, polyvinyl ethers. Also suitable is BYK-354 which is a polyacrylate solution, and BYK-022 which is a mixture of hydrophobic solids and foam destroying polysiloxanes in polyglycol. Preferably the polyether defoaming agent is an alkoxylated alkyl phenol, more particularly a mixtures of petroleum distillates and an ethoxylated alkyl phenol, such as that sold by BYK-Chemie under the tradename BYK-033.

Adhesion Promoter

The ink compositions used in the invention also preferably contain about 0.01–25%, preferably about 0.05–15%, more preferably about 0.1–5% of a silane adhesion promoter which will enhance adhesion of the cured resin to the glass surface. Examples of silanes are silane esters, vinyl silanes, methacryloxy silanes, epoxy silanes, sulfur silanes, amino silanes, or isocyanoto silanes. Suitable silanes include organofunctional silanes of the formula:

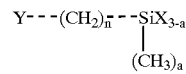

wherein n=0–3 a=0–2

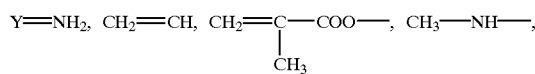
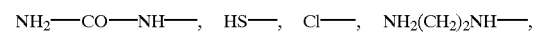

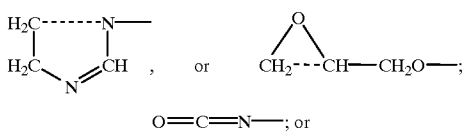

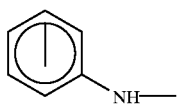

X is each independently $CH_3$, Cl, $OCOCH_3$, $OC_2H_4OCH_3$, $(OC_2H_4)_2OCH_3$, or —OR, where R is a $C_{1-20}$ straight or branched chain alkyl, preferably methyl or ethyl.

Silanes having this formula are commercially available under the Dynasylan trademark from Huls, America, Inc., Piscataway, N.J. or Osi Specialities Inc. Other organofunctional silanes such as those disclosed in U.S. Pat. No. 5,221,560, which is hereby incorporated by reference, are also suitable. Such organosilanes are acryloxyfunctional silanes including 3-methacryloxypropyltrimethoxysilane, 3-acryloxypropyltrimethoxysilane, 2-methacryloxyethyltrimethyoxysilane, 2-acryloxyethyltrimethyoxysilane, 3-methacryloxypropyltriethoxysilane, 3-acryloxypropyltrimethyoxysilane, 3-acryloxypropyltriethoxysilane, 2-methacryloxyethyltriethoxysilane, 2-methacryloxyethyltriethoxysilane, 2-acryloxyethyltriethoxysilane, etc. Suitable glycidoxy silanes include 3-glycidoxypropyltrimethoxysilane, 2-glycidoxyethyltrimethoxysilane, 3-glycidoxypropyltriethoxysilane, 2-glycidoxyethyltriethoxysilane, 3-glycidoxypropyltrimethyl silane, and so on. Preferred for use in the compositions of the invention are acryloxy-functional silanes, isocyanato silanes, and amino silanes. The preferred acryloxy- functional silane is 3-methacryloxypropyl trimethoxy silane, which is sold by Huls America, Inc. under the tradename DYNASYLAN MEMO. The preferred amino silane is sold by Huls America, Inc. under the tradename DYNASYLAN TRIAMO. The preferred isocyanoto silane is sold by Osi Specialities Inc., under the tradename A-1310. In the preferred ink compositions of the invention a mixture of the three silanes is preferred, generally 0.01–2% by weight of each.

Surfactant

The ink compositions also preferably contain contain 0.01–20%, preferably 0.5–10%, more preferably 1–5% by weight of a fluorinated surfactant. The term "fluorinated surfactant" means a fluorine containing compound having at least one liphophilic group or portion and at least one hydrophilic group or portion. In particular, fluorocarbon or fluorosilicone surfactants are most desireable. Suitable surfactants include those set forth in U.S. Pat. No. 4,961,976 which is hereby incorporated by reference. Preferred are fluorocarbon surfactants, such as those marketed under the Fluorad trademark by 3M Company. These fluorochemical surfactants include fluorinated alkyl esters, fluorinated alkyl polyoxyethylene ethanols, and the like. Particularly preferred are nonionic fluorinated alkyl alkoxylates e.g. those marketed by 3M under the trademark FC-171. Preferred are fluroinated $C_{1-30}$ alkyl ethoxylates and propoxylates.

Photoinitiator

The ink compositions preferably contain a photoinitiator which catalyzes the polymerization of the monomers upon exposure to the radiation by which the monomers are curable. There are generally two types of photoinitiators: free radical and cationic. Free radical initiators are more commonly used with ethylenically unsaturated monomers and oligomers, while cationic photoinitiators are used with epoxy or vinyl ether functional resins. Preferably, the compositions used in the invention contain free radical photoiniators. Suitable free radical-type photoiniators include carbonyl compounds such as ketones, acetophenones, benzophenones, and derivatives thereof. Examples of such materials include, for example, methyl ethyl ketone; benzophenone; benzyl dimethyl ketal; 1-hydroxycyclohexylphenylketone; diethyoxyacetophenone; 2-methyl-1-(methylethiophenyl)-2-(4-morpholinyl)-1-propanone; 2-benzyl-2-N,N-dimethylamino-1,4(4-morpholinophenyl)-1-butanone; 2,2-dimethoxy-2-phenyl acetophenone; 2-methyl-1-[4-(methylthio)phenyl]-2-morpholino propan-1-one; 2-hydroxy- 2-methyl-1-phenyl-propan-1-one; 4-(2-hydroxyethoxy)phenyl-(2-hydroxy-2-methylpropyl)ketone; and a mixture of bis(2,6-dimethyoxybenzoyl)-2-4-4-trimethylpentyl phosphine oxide and 2-hydroxy-2-methyl-1-phenyl-propan-1-one. Preferred is a mixture of 25% bis(2,6-dimethyoxybenzoyl)-2-4-4-trimethylpentyl phosphine oxide and 75% 2-hydroxy-2-methyl-1-phenyl-propan-1-one, which is sold under the tradename Irgacure 1700 by Ciba-Geigy.

Small amounts of cationically curable monomers or oligomers may be used in the compositions of the invention, for example less than about 10%, preferably less than about 5% by weight of the ink composition. However, cationically cured compositions generally exhibit a high bond strength to glass, such that if they are used in substantial amounts in the compositions of the invention, the ink will not be stripped from the glass upon exposure to alkali. If cationically curable monomers or oligomers are used in the compositions of the invention, it is desirable to use cationic photoinitiators. The term "cationic photoinitiator" means a molecule or ingredient which, upon excitation, undergoes a photochemical transformation which efficiently generates a species capable of initiating cationic polymerization. If the ink composition of the invention is cured by UV or actinic radiation rather than electron beam it is desirable to add a cationic photoinitiator which catalyzes cross-linking of the resin upon exposure to the radiation to which the resin is sensitive. On the other hand, if the ink compositions of the invention are cured with electron beam it may be possible to dispense with the cationic photoinitiator. Various types of cationic photoinitiators are suitable. Both ionic cationic photoinitiators such as onium salts or organometallic salts are suitable as well as non-ionic cationic photoinitiators such as organosilanes, latent sulphonic acids and the like. Preferred are photosensitive onium salts, in particular, onium salts such as those disclosed in U.S. Pat. Nos. 4,058,401, 4,138,255, 4,161,478, 4,175,972, all of which are hereby incorporated by reference. Triaryl sulphonium salts are most preferred, in particular triaryl sulphonium salts such as those sold by Union Carbide under the tradename Cyracure UVI 6990 and 6974. Also suitable are ferrocenium salts such as those sold under the Irgacure tradename by Ciba-Geigy, in particular Irgacure 261. Sulphonyloxy ketones and silyl benzyl ethers are also good cationic photoinitiators. A detailed analysis of the mechanism of cationic curing is disclosed in "Photosensitized Epoxides as a Basis for Light-Curable Coatings" by William R. Watt, American Chemical Society Symposium, Ser. 114, Epoxy Resin Chemistry, Chapter 2, 1979, and in "Chemistry and Technology of UV and EB Formulation for Coatings, Inks, and Paints," Volume 3, entitled "Photoinitiators for Free Radical and Cationic Polymerization, K. K. Dietliker, pages 332–374 (1991), both of which are hereby incorporated by reference. Photosensitive onium salts are used as photoinitators in cationic curing, in particular, onium salts such as those disclosed in U.S. Pat. Nos. 4,058,401, 4,138,255, 4,161,478, 4,175,972, all of which are hereby incorporated by reference. Triaryl sulphonium salts are most preferred, in particular triaryl sulphonium salts such as those sold by Union Carbide under the tradename Cyracure UVI 6990 and 6974. The photoiniator is generally present at about 0.1–15%, preferably about 0.5–12%, more preferably about 0.5–10% by weight of the total composition.

The preferred ink compositions used in the invention comprise:

5–95% of an ethylenically unsaturated monomer or oligomer containing at least one free acid group, 5–95% pigment, and 5–95% of a monomer or oligomer free of acid groups.

More preferably, the ink composition comprises, in addition, an ingredient selected from the group consisting of about 0.1–25% of a silane adhesion promoter, about 0.01–10% of a polyether defoaming agent, about 0.01–20% of a fluorinated surfactant, and about 0.1–1% of a photoinitiator.

THE DECORATING METHOD

The term "ceramic" or "vitreous article" when used in accordance with the invention shall mean glass, ceramic, tile, and similar vitreous materials. The articles which may be decorated or printed according to the method of the invention may be in any shape or form, such as a container, sheet, tile, figurine, or the like. In the preferred embodiment of the invention the article is made of glass or ceramic and is a container, such as a cosmetic or beverage container.

The ink composition is applied to the article to be decorated in a predetermined design using a variety of printing methods including screen printing, offset printing, gravure, hand painting and the like. After the ink is applied the substrate or article is irradiated with UV or actinic radiation using a conventional UV light source. The term "UV" means ultraviolet light which generally has a wavelength of 4 to 400, preferably 325 to 400 nanometers. The term "actinic" means radiation having a wavelength of 200 to 600 nanometers. Electron beam may be used instead of a UV light source. If a UV conveyer is used, it is set up so that the substrate passes through the beam of radiation for an amount of time appropriate to completely cure the ink composition and cause it to adhere to the substrate. If desired, the substrate may be moved through the conveyer in one or more passes to achieve the required curing. The appropriate time varies depending on the ink formula, but generally curing is complete in a period of time ranging from fractions of a second to 30 minutes. It is preferred, that by the time the decorated substrate or article is removed from the conveyer, the ink is completely cured and fused to the substrate surface. In some cases it may be necessary to subject the newly screened glass container to slightly elevated temperature prior to UV curing the applied ink on the substrate, or to an additional post-UV cure application of heat to finally polymerize the ink on the substrate. Preferably, the decorated substrate is subjected to post-UV cure heating at a temperature of 90 to 200° C., preferably 100–200° C. for a period of 0.5 to 30 mintues.

The ink compositions are well suited for use in automated systems such as the multiple color printing apparatus disclosed in copending application Ser. No. 432,485, filed May 1, 1995 by Kamen, et al., entitled "Apparatus and Method For Screen Printing Radiation Curable Compostions", or with the methods disclosed in U.S. Pat. No. 5,562,951, both of which are hereby incorporated by reference.

In another embodiment of the invention, it is possible to make the ink composition of the invention without the pigment and print it on the glass substrate in predetermined design according to the methods described above. For example, a substrate such as a container may be decorated in a pre-determined design by silk screening the unpigmented ink composition on the substrate and curing with the appropriate radiation. A layer of hot stamping foil is then compressed against the substrate with a press which is heated to a temperature sufficient to cause the hot stamping foil to adhere to the printed ink design but not to the ink-free areas of the glass. Hot stamping foil is generally a laminate comprised of a carrier material (often polyester or a similar material capable of release), a release film between the carrier and a subsequent decorative coat which is usually color or a metallized coat, most often aluminum or colored aluminum. The foil may contain other optional layers such as one or more protective layers, hot melt adhesive layers, etc. between the metallized layer or layers and the carrier material. More specifically, hot stamping foil can be defined as a multilayer web comprised of a backing film carrier, a release coating, one or more protective top coatings, one or more color coatings, and a hot melt adhesive in that order. The hot stamping foil is then compressed against the container with the hot melt adhesive layer being compressed against the substrate. The compress, which may be a standard hot stamping press or a hand held press, is heated to a temperature sufficient to cause the hot melt adhesive layer of the hot stamping foil to adhere to the ink decorated portion of the substrate. Generally this temperature ranges from about 250 to 400° F. Temperatures higher than this may cause deterioration of the hot stamping foil. The application of heat causes the adhesive side of the hot stamping foil to become adhesively adhered to the ink design but not to the ink-free areas of the substrate. When the compress is removed, a portion of the foil laminate adheres to the ink decoration but not to the ink free areas of the glass. In particular, adhered to the ink design on the substrate is the hot melt adhesive layer, the color coatings, and the protective top coatings, in that order, of the hot stamping foil. Portions of the release coating may or may not be adhered to the protective top coating because the release coating is designed to melt upon application of heat and cause the polyester carrier backing layer to release from the protective top coat layer and some remnants may remain. The resulting hot stamped substrate exhibits a metallic gold, silver, or colored appearance depending on the color of the hot stamping foil.

In yet another embodiment of the invention, it is possible to provide a decorated substrate which has a two tone effect where all or a portion of the colored ink on the substrate is hot stamped. In this instance a pigmented ink composition is applied to the substrate in a predetermined design and cured by exposing it to the radiation by which it is curable for a time sufficient to effect complete cure. Hot stamping foil is applied as described above to either the entire ink design or to only a part (i.e. complete or partial registration). If the hot stamping foil is applied in partial registration, or applied to a portion of the pigmented ink design, a pleasant two tone effect is achieved. Many times it is more economical to print the entire design on the substrate using colored ink and then hot stamp over the desired portion of the design, rather than applying clear ink and hot stamping, and then printing colored ink in the desired design in a second application.

The ink compositions of the invention provide sufficient adhesion to glass as well as exhibiting sufficient resistance to scuffing and scratching to make the decorated articles suitable for use on commercial beverage and cosmetic bottles.

THE STRIPPING METHOD

The ink compositions of the invention can be removed from glass upon exposure of the glass to alkali. In particular, the free acid groups found in the polymerized ink composition are capable of reacting with the hydroxyl groups of the base to form a salt which is easily stripped or removed from the glass.

The aqueous alkaline solution comprises about 1–20%, preferably about 2–15%, more preferably about 2–12% by weight alkali. Suitable alkali materials include metal hydroxides (e.g. alkali metal and alkaline earth metal hydroxides) such as sodium hydroxide, potassium hydroxide, calcium hydroxide, and the like.

The cured ink compositions should be removed from the glass upon exposure to the aqueous alkali after a period of about 1 to 120, preferably about 1–60, more preferably about 1–30 minutes. The glass substrate is generally immersed in the aqueous alkali solution for the appropriate time period, after which the ink compositions are removed from the glass surface.

Preferably the glass container is subjected to the aqueous alkaline solution at a temperature of 60 to 100° C., more preferably 70 to 95° C., most prefereably 72 to 90° C.

In the most preferred embodiment of the invention the ink composition is removed from the glass containers after exposure of the glass to a 4% (approximately) aqueous solution of sodium hydroxide at a temperature of 70 to 100° C., after 1–15 minutes.

The decorating method and compositions of the invention are excellent for use on glass containers used in the returnable beverage market. The decorative indicia applied according to the invention remains on the glass for the useful commercial life of the container, yet can be easily removed upon exposure to an aqueous alkali solution. This eliminates the need for paper labels and decals, which results in a significant cost savings. Also, the indicia are much more aesthetically pleasing, similar to the aesthetics achieved with ACL. Thus, beverage and cosmetic manufacturers are able to offer glass containers that provide aethestics similar to ACL, with indicia that can be easily removed upon exposure to alkali solutions when the glass container is returned to the filler.

The invention will be further described in connection with the following examples, which are set forth for the purposes of illustration only.

EXAMPLE 1

A white ink composition was made as follows:

| | grams | wt % |
|---|---|---|
| Dipentaerythritol pentaacrylate[1] | 25.0 | 24.8 |
| Epoxy acrylate + tripropylene glycol acrylate[2] | 27.0 | 26.8 |
| Aromatic acid methacrylate ½ ester in ethoxylated trimethylolpropane triacrylate[3] | 5.0 | 5.0 |
| Beta carboxyethyl acrylate[4] | 10.0 | 9.9 |
| Aromatic urethane acrylate with polyacrylated polyol diluent[5] | 10.0 | 9.9 |
| Titaniwn dioxide (pigment) | 17.0 | 16.9 |
| Irgacure 1700[6] | 3.0 | 3.0 |
| Gamma-isocyanotopropyltriethoxysilane[7] | 0.5 | 0.5 |
| 3-methacryloxypropyl trimethoxysilane8 | 0.5 | 0.5 |
| Trimethoxysilylpropyldiethylene triamine[9] | 0.5 | 0.5 |

-continued

A white ink composition was made as follows:

| | grams | wt % |
|---|---|---|
| Fluorinated alkyl alkoxylate[10] | 0.5 | 0.5 |
| BYK-033[11] | 1.0 | 1.0 |
| Modaflow[12] | 0.8 | 0.8 |

[1]SR399, Sartomer Company, Inc. (other polymerizable reactant)
[2]CN104, Sartomer Company, Inc. (other polymerizable reactant)
[3]SB500 E50, Sartomer Company, Inc. (polymerizable reactant with free acid group)
[4]B-CEA, UCB Radcure Inc. (polymenzable reactant with free acid group)
[5]EB-220, UCB Radcure Inc. (other polymerizable reactant)
[6]Ciba-Geigy Corp. Mixture of 25% by weight bis(2,6-dimethoxybenzoyl)-2,4-,4-trimethylpentyl phosphine oxide and 75% by weight 2-hydroxy-2-methyl-1-phenyl-propan-1-one. (photoinitiator)
[7]A-1310, Osi Specialities, Inc. (adhesion promoter)
[8]DYNASYLAN MEMO, Huls America Inc. (adhesion promoter)
[9]DYNASYLAN TRIAMO, Huls America Inc. (adhesion promoter)
[10]FC-171, 3M Company (surfactant)
[11]BYK-033, BYK-Chemie. A mixture of 92% by weight of petroleum distillates and 5% by weight ethoxylated alkyl phenol (defoaming agent)
[12]Modaflow, Monsanto, Inc. Ethyl acrylate and 2-ethylhexyl acrylate copolymer (defoaming agent)

The ink composition was made by combining the ingredients and mixing well.

EXAMPLE 2

A blue ink composition was made as follows:

| | grams | wt % |
|---|---|---|
| Dipentaerythritol pentaacrylate[1] | 25.0 | 23.9 |
| Epoxy acrylate + tripropyiene glycol acrylate[2] | 27.0 | 25.8 |
| Aromatic acid methacrylate ½ ester in ethoxylated trimethylolpropane triacrylate[3] | 5.0 | 4.8 |
| Beta carboxyethyl acrylate[4] | 10.0 | 9.6 |
| Aromatic urethane acrylate with polyacrylated polyol diluent[5] | 10.0 | 9.6 |
| Ultramarine blue 5009[13] | 20.0 | 19.1 |
| Irgazin blue X-3367[14] | 1.0 | 0.9 |
| Irgacure 1700[6] | 3.0 | 2.9 |
| Gamma-isocyanotopropyitriethoxysilane[7] | 0.5 | 0.5 |
| 3-methacryloxypropyl trimethoxysilane[8] | 0.5 | 0.5 |
| Trimethoxysilylpropyidiethylene triamine[9] | 0.5 | 0.5 |
| Fluorinated alkyl alkoxyiate[10] | 0.5 | 0.5 |
| BYK-033[11] | 1.0 | 1.0 |
| Modaflow[12] | 0.5 | 0.4 |

[1]SR399, Sartomer Company, Inc. (other polymerizable reactant)
[2]CN104, Sartomer Company, Inc. (other polymerizable reactant)
[3]SB500 E50, Sartomer Company, Inc. (polymerizable reactant with free acid group)
[4]B-CEA, UCB Radcure Inc. (polymenzable reactant with free acid group)
[5]EB-220, UCB Radcure Inc. (other polymerizable reactant)
[6]Ciba-Geigy Corp. Mixture of 25% by weight bis(2,6-dimethoxybenzoyl)-2,4-,4-trimethylpentyl phosphine oxide and 75% by weight 2-hydroxy-2-methyl-1-phenyl-propan-1-one. (photoinitiator)
[7]A-1310, Osi Specialities, Inc. (adhesion promoter)
[8]DYNASYLAN MEMO, Huls America Inc. (adhesion promoter)
[9]DYNASYLAN TRIAMO, Huls America Inc. (adhesion promoter)
[10]FC-171, 3M Company (surfactant)
[11]BYK-033, BYK-Chemie. A mixture of 92% by weight of petroleum distillates and 5% by weight ethoxylated alkyl phenol (defoaming agent)
[12]Monsanto, Inc. Ethyl acrylate and 2-ethylhexyl acrylate copolymer (defoaming agent)
[13]Wittaker, Clark, & Daniels (pigment)
[14]Ciba Pigment Division The ink composition was made by combining the ingredients and mixing well.

EXAMPLE 3

A white ink composition was made as follows:

| | grams | wt % |
|---|---|---|
| Aromatic acid methacrylate ½ ester in ethoxylated trimethylolpropane triacrylate | 25.0 | 24.5 |
| Beta carboxyethyl acrylate[2] | 35.0 | 34.2 |
| Monofunctional acrylate resin[3] | 15.0 | 14.7 |
| Epoxy acrylate + tripropylene glycol acrylate[4] | 5.0 | 4.9 |
| Titanium dioxide | 15.0 | 14.7 |
| Iragacure 1700[5] | 3.0 | 2.9 |
| BYK-033[6] | 1.0 | 1.0 |
| 3-methacryloxypropyl trimethoxysilane[7] | 0.6 | 0.6 |
| Gamma-isocyanotopropyltriethoxysilane[8] | 0.6 | 0.6 |
| Methyl diethanolamine | 2.0 | 1.9 |

[1]SB500 E50, Sartomer Company, Inc. (polymerizable reactant with free acid group)
[2]B-CEA, UCB Radcure Inc. (polymenzable reactant with free acid group)
[3]Aromatic oligomer containing pendant carboxy functional groups, Henkel Corporation (polymerizable reactant with free acid group)
[4]CN104, Sartomer Company, Inc. (other polymerizable reactant)
[5]Ciba-Geigy Corp. Mixture of 25% by weight bis(2,6-dimethoxybenzoyl)-2,4-,4-trimethylpentyl phosphine oxide and 75% by weight 2-hydroxy-2-methyl-1-phenyl-propan-1-one. (photoinitiator)
[6]BYK-033, BYK-Chemie, A mixture of 92% by weight of petroleum distillates and 5% by weight ethoxylated alkyl phenol (defoaming agent)
[7]DYNASYLAN MEMO, Huls America Inc. (adhesion promoter)
[8]A-1310, Osi Specialities, Inc. (adhesion promoter)

The ingredients were combined and mixed well.

EXAMPLE 4

A ultramarine blue composition was made as follows:

| | grams | wt % |
|---|---|---|
| Aromatic acid methacrylate ½ ester in ethoxylated trimethylolpropane triacrylate[1] | 25.0 | 24.2 |
| Beta carboxyethyl acrylate[2] | 30.0 | 29.1 |
| Monofunctional acrylate resin[3] | 15.0 | 14.5 |
| Epoxy acrylate + tripropylene glycol acrylate[4] | 5.0 | 4.8 |
| Irgazin blue X-3367[5] | 1.0 | 1.0 |
| Ultramarine blue 5009[6] | 20.0 | 19.4 |
| Iragacure 1700[7] | 3.0 | 2.9 |
| BYK-033[8] | 1.0 | 1.0 |
| 3-methacryloxypropyl trimethoxysilane[9] | 0.6 | 0.6 |
| Gamma-isocyanotopropyltriethoxysilane[10] | 0.6 | 0.6 |
| Methyl diethanolamine | 2.0 | 1.9 |

[1]SB500 E50, Sartomer Company, Inc. (polymerizable reactant with free acid group)
[2]B-CEA, UCB Radcure Inc. (polymenzable reactant with free acid group)
[3]Aromatic oligomer containing pendant carboxy functional groups, Henkel Corporation (polymerizable reactant with free acid group)
[4]CN104, Sartomer Company, Inc. (other polymerizable reactant)
[5]Ciba Pigment Division
[6]Wittaker, Clark, & Daniels (pigment)
[7]Ciba-Geigy Corp. Mixture of 25% by weight bis(2,6-dimethoxybenzoyl)-2,4-,4-trimethylpentyl phosphine oxide and 75% by weight 2-hydroxy-2-methyl-1-phenyl-propan-1-one. (photoinitiator)
[8]BYK-033, BYK-Chemie, A mixture of 92% by weight of petroleum distillates and 5% by weight ethoxylated alkyl phenol (defoaming agent)
[9]DYNASYLAN MEMO, Huls America Inc. (adhesion promoter)
[10]A-1310, Osi Specialities, Inc. (adhesion promoter)

The ingredients were combined and mixed well.

EXAMPLE 5

A white ink composition was made as follows:

| | grams | wt % |
|---|---|---|
| Aromatic acid methacrylate ½ ester in ethoxylated trimethylolpropane triacrylate[1] | 25.0 | 22.8 |
| Epoxy acrylate + tripropylene glycol acrylate[2] | 10.0 | 9.1 |
| Beta-carboxyethyl acrylate[3] | 30.0 | 27.3 |
| Monofunctional acrylate resin[4] | 15.0 | 13.7 |
| Polytetrafluoroethylene[5] | 1.0 | 0.9 |
| Titanium dioxide | 17.0 | 15.5 |
| Irgacure 1700[6] | 3.0 | 2.7 |
| BYK-033[7] | 1.5 | 1.4 |
| 3-methacryloxypropyl trimethoxysilane[8] | 0.6 | 0.5 |
| Gamma-isocyanotopropyldiethylene triamine[9] | 0.6 | 0.5 |
| Monodiethanolamine | 3.0 | 2.8 |
| Benzophenone | 3.0 | 2.8 |

[1]SB500 E50, Sartomer Company, Inc. (polymerizable reactant with free acid group)
[2]CN104, Sartomer Company, Inc. (other polymerizable reactant)
[3]B-CEA, UCB Radcure Inc. (polymenzable reactant with free acid group)
[4]Aromatic oligomer containing pendant carboxy functional groups, Henkel Corporation (polymerizable reactant with free acid group)
[5]SST-4, Shamrock Technologies, Inc. (thickening agent)
[6]Ciba-Geigy Corp. Mixture of 25% by weight bis(2,6-dimethoxybenzoyl)-2,4-,4-trimethylpentyl phosphine oxide and 75% by weight 2-hydroxy-2-methyl-1-phenyl-propan-1-one. (photoinitiator)
[7]BYK-033, BYK-Chemie, A mixture of 92% by weight of petroleum distillates and 5% by weight ethoxylated alkyl phenol (defoaming agent)
[8]DYNASYLAN MEMO, Huls America Inc. (adhesion promoter)
[9]A-1310, Osi Specialities, Inc. (adhesion promoter)

The composition was made by combining the ingredients and mixing the ingredients well.

EXAMPLE 6

A blue ink composition was made according to the following formula:

| | grams | wt % |
|---|---|---|
| Aromatic acid methacrylate ½ ester in ethoxylated trimethylolpropane triacrylate[1] | 25.0 | 24.7 |
| Epoxy acrylate + tripropylene glycol acrylate[2] | 10.0 | 9.9 |
| Beta-carboxyethyl acrylate[3] | 25.0 | 24.7 |
| Monofunctional acrylate resin | 15.0 | 14.8 |
| Ultramarine blue 5009[5] | 15.0 | 14.8 |
| Irgazin blue X-3367[6] | 1.5 | 1.5 |
| Polytetrafluoroethylene[7] | 1.0 | 1.0 |
| Irgacure 1700[8] | 3.0 | 3.0 |
| Benzophenone | 3.0 | 3.0 |
| BYK-033[9] | 1.5 | 1.4 |
| 3-methacryloxypropyl trimethoxysilane[10] | 0.6 | 0.5 |
| Gamma-isocyanatopropyltriethoxysilane[11] | 0.6 | 0.5 |

[1]SB500 E50, Sartomer Company, Inc. (polymerizable reactant with free acid group)
[2]CN104, Sartomer Company, Inc. (other polymerizable reactant)
[3]B-CEA, UCB Radcure Inc. (polymenzable reactant with free acid group)
[4]Aromatic oligomer containing pendant carboxy functional groups, Henkel Corporation (polymerizable reactant with free acid group)
[5]Wittaker, Clark, & Daniels (pigment)
[6]Ciba Pigment Division
[8]Ciba-Geigy Corp. Mixture of 25% by weight bis(2,6-dimethoxybenzoyl)-2,4-,4-trimethylpentyl phosphine oxide and 75% by weight 2-hydroxy-2-methyl-1-phenyl-propan-1-one. (photoinitiator)
[9]BYK-033, BYK-Chemie. A mixture of 92% by weight of petroleum distillates and 5% by weight ethoxylated alkyl phenol (defoaming agent)
[10]DYNASYLAN MEMO, Huls America Inc. (adhesion promoter)
[11]A-1310, Osi Specialities, Inc. (adhesion promoter)

The ingredients were combined and mixed well.

EXAMPLE 7

The white ink composition of Example 2 was applied to alcoholic beverage bottles by screen printing with a 230 mesh screen using an Autoroll M-25 semi-automatic screen printing machine. The ink on the bottle was screened by exposure to UV light from a P600 power supply having a 9mm. D bulb. The curing speed was less than one second per bottle. Then, the blue ink of Example 2 was screened onto the bottle in partial registration with the cured white ink. The ink was cured upon exposure to the UV light source. The bottle was then subjected to post heat curing at a temperature of 100° C. for 30 minutes. The indicia adhered well to the bottle and exhibited bright, true coloration.

EXAMPLE 8

The finished bottles decorated in accordance with Example 7 were immersed in a water bath containing 4% sodium hydroxide at a temperature of 72° C. The cured inks were completely removed from the bottles after 4 minutes.

While the invention has been described in connection with the preferred embodiment, it is not intended to limit the scope of the invention to the particular form set forth but, on the contrary, it is intended to cover such alternatives, modifications, and equivalents as may be included within the spirit and scope of the invention as defined by the appended claims.

We claim:

1. A method for decorating a vitreous article comprising the steps of:
   a) applying to the vitreous article in a predetermined design a radiation curable ink composition comprising free acid groups which is (i) operable when cured to bond to the vitreous article, and (ii) strippable from the vitreous article upon exposure to alkali, followed by,
   b) curing the ink on the vitreous article by exposing it to the radiation by which it is curable, and thereafter,
   c) subjecting the decorated vitreous article to a temperature of about 90 to 200° C. for 0.5 to 30 minutes to bond the ink to the vitreous article.

2. The method of claim 1 wherein the alkali is an aqueous alkaline solution.

3. The method of claim 2 wherein the aqueous alkaline solution comprises 2 to 10% by weight of alkali.

4. The method of claim 3 wherein the alkaline solution is an aqueous solution of sodium hydroxide or potassium hydroxide.

5. The method of claim 4 wherein the alkaline solution contains 4% by weight of sodium hydroxide.

6. The method of claim 1 wherein the ink composition is strippable from the vitreous article upon exposure to an aqueous alkaline solution for a period of 1 to 60 minutes, wherein said aqueous alkaline solution has a temperature of 60 to 100° C., and contains 2 to 20% by weight of the total alkali composition of alkali.

7. The method of claim 1 wherein the ink composition comprises a monomer or oligomer having at least one free acidic group.

8. The method of claim 7 wherein the acidic group is a carboxylic acid group, a phosphoric acid group, or a sulfonic acid group.

9. The method of claim 7 wherein the monomer or oligomer is an ethylenically unsaturated monomer or oligomer.

10. The method of claim 9 wherein the ethylenically unsaturated monomer or oligomer is an acrylate or methacrylate.

11. The method of claim 10 wherein the acidic group is a carboxylic acid group.

12. The method of claim 11 wherein the monomer or oligomer contains repeating alkylene oxide units.

13. The method of claim 11 wherein the monomer or oligomer is an aromatic acid anhydride.

14. The method of claim 1 wherein the ink composition comprises, by weight of the total composition:
   about 5–95% of a ethylenically unsaturated monomer or oligomer having at least one free acid group, and,
   about 5–95% pigment.

15. The method of claim 14 wherein the ink composition further comprises about 0.5–25% by weight of the total composition of a silane adhesion promoter.

16. The method of claim 14 wherein the ink composition further comprises about 0.01–10% by weight of the total composition of a polyether defoaming agent.

17. The method of claim 14 wherein the ink composition further comprises a fluorinated surfactant.

18. The method of claim 1 wherein the ink is curable by exposure to actinic radiation.

19. The method of claim 1 wherein the ink is curable by exposure to ultraviolet radiation.

20. The method of claim 1 wherein the vitreous article is glass.

21. A method for stripping decorative indicia from a glass substrate decorated with a radiation cured ink composition containing free acid groups which is (i) operable after radiation curing and exposure of the decorated vitreous article to a temperature of about 90 to 200° C. for 0.5 to 30 minutes to bond to glass and, (ii) strippable from the glass upon exposure to alkali, comprising contacting the glass substrate having the decorative inidicia thereon, with an aqueous alkaline solution containing about 2–20% by weight alkali for a period of 1 to 60 minutes.

22. The method of claim 21 wherein the glass substrate having the decorative indicia thereon is contacted with the aqueous alkaline solution at a temperature of about 60 to 100° C.

23. The method of claim 21 wherein the radiation cured ink composition is a polymeric composition formed by the polymerization of ethylenically unsaturated monomers or oligomers having at least one free acid group.

24. The method of claim 23 wherein the ethylenically unsaturated monomers or oligomers are acrylates or methacrylates.

25. The method of claim 23 wherein the acid group is a carboxylic acid group, a sulfonic acid group, or a phosphoric acid group.

26. The method of claim 25 wherein the acid group is a carboxylic acid group.

* * * * *